(12) United States Patent
De Jong

(10) Patent No.: US 8,887,173 B2
(45) Date of Patent: Nov. 11, 2014

(54) METHOD AND SYSTEM FOR COMMUNICATING BETWEEN COMPUTING DEVICES

(75) Inventor: Menno De Jong, Enschede (NL)

(73) Assignee: EchoStar Global B.V., Almelo (NL)

( * ) Notice: Subject to any disclaimer, the term of this patent is extended or adjusted under 35 U.S.C. 154(b) by 43 days.

(21) Appl. No.: 13/518,362

(22) PCT Filed: Dec. 10, 2010

(86) PCT No.: PCT/EP2010/069428
§ 371 (c)(1),
(2), (4) Date: Jun. 21, 2012

(87) PCT Pub. No.: WO2011/076593
PCT Pub. Date: Jun. 30, 2011

(65) Prior Publication Data
US 2012/0278822 A1 Nov. 1, 2012

(30) Foreign Application Priority Data
Dec. 22, 2009 (EP) .................................... 09180496

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............ 719/313; 719/318; 719/320; 719/328

(58) Field of Classification Search
None
See application file for complete search history.

(56) References Cited

U.S. PATENT DOCUMENTS

| | | | |
|---|---|---|---|
| 6,859,451 B1 * | 2/2005 | Pasternack et al. ........... | 370/352 |
| 7,171,454 B2 | 1/2007 | Nguyen | |
| 8,243,683 B2 | 8/2012 | Young et al. | |
| 2005/0015220 A1 * | 1/2005 | Ramchandi ................... | 702/188 |
| 2005/0172282 A1 | 8/2005 | Shenfield et al. | |
| 2008/0172451 A1 * | 7/2008 | Kim et al. ...................... | 709/203 |
| 2010/0114620 A1 * | 5/2010 | Diament et al. .................. | 705/7 |

FOREIGN PATENT DOCUMENTS

| | | |
|---|---|---|
| CN | 101442515 B | 5/2009 |
| WO | 2005082072 A3 | 9/2005 |

OTHER PUBLICATIONS

European Patent Office "International Search Report" mailed Mar. 2, 2011; International Appln. No. PCT/EP2010/069428, filed Dec. 10, 2010.

(Continued)

*Primary Examiner* — H S Sough
*Assistant Examiner* — Craig Dorais
(74) *Attorney, Agent, or Firm* — Ingrassia Fisher & Lorenz, P.C.

(57) ABSTRACT

A provider device includes structured data schemas, which may be JSON schemas, that correspond to APIs. A requestor device connects to the provider device and the provider device transmits available schemas. The requestor device receives the available schemas and transmits a communication request that asks for one or more of the available schemas. The provider device receives the communication request, formats information regarding APIs according to the specified schemas, and transmits the formatted information. The formatted information specifies how the requestor device can utilize the APIs. The requestor device generates one or more API commands by processing the formatted data and transmits the API commands to the provider device. The provider device then receives and performs the API commands. Subsequently, the provider device may transmit results to the requestor device, which may evaluate the results.

11 Claims, 4 Drawing Sheets

(56) References Cited

OTHER PUBLICATIONS

Crockford et al. "JSON: The Fat-Free Alternative to XML," Internet Citation, Dec. 6, 2006, pp. 1-7, XP002577300, retrieved from the Internet: URL:http://web.archive.org/web/20061207200810lhttp://2006, xmlconference.org/programme/presentations/176.html.

Tourwe, T. et al. "Automated Support for Data Exchagne Via XML," Multimedia Software Engineernig, 2003, Proceedings, Fifth International Symposium on Dec. 10-12, 2003, Piscataway, NJ, USA, IEEE, Dec. 10, 2003, pp. 70-77, XP010674446, DOI: DOI: 10.1109/MMSE2003,1254424; ISGN: 978-0-7695-2031-5.

European Patent Office "International Preliminary Report on Patentability" mailed Feb. 20, 2012; International Appln. No. PCT/EP2010/069428, filed Dec. 10, 2010.

Canadian Intellectual Property Office, Office Action, dated Apr. 2, 2014 for Canadian Patent Application No. 2,785,062.

\* cited by examiner

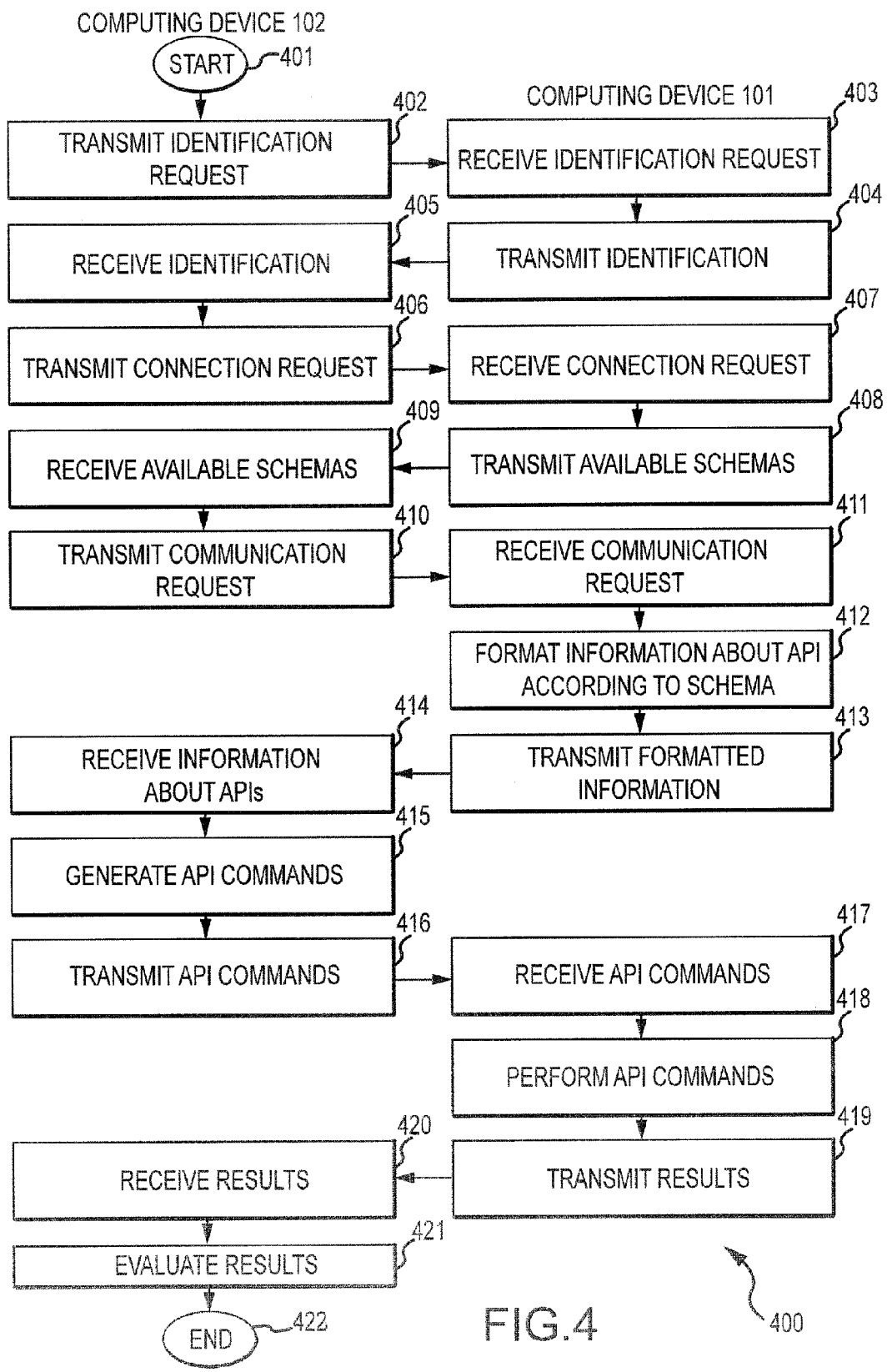

METHOD AND SYSTEM FOR COMMUNICATING BETWEEN COMPUTING DEVICES

CROSS-REFERENCES TO RELATED APPLICATIONS

This Application claims priority to International Application No. PCT/EP2010/069428, filed Dec. 10, 2010, which claims priority to European Patent Application No. 09180496.3, filed Dec. 22, 2009.

TECHNICAL FIELD

The following discussion relates generally to communication between computing devices, and more specifically to presenting and/or accessing an application programming interface via a structured data schema.

BACKGROUND

The present disclosure provides systems and methods that enable communication between computing devices. A provider device may include structured data schemas, which may be JSON (JavaScript Object Notation) schemas, that correspond to one or more APIs of the provider device. The provider device may be operable to format information about the APIs in accordance with the structured data schemas in response to requests from requestor devices.

SUMMARY

In one aspect, the present invention is directed to a provider device receives a connection request. In response to the connection request, the provider device transmits the available structured data schemas. The provider device then receives a communication request that specifies at least one of the available structured data schemas, formats information regarding APIs according to the specified structured data schemas, and transmits the formatted information. The formatted information specifies how the other computing device can utilize the APIs. The provider device then receives and performs API commands that were generated by processing the formatted information. The provider device may transmit results of the performance.

According to a first aspect of the present invention, there is provided a method for communicating between computing devices, comprising: receiving a communication request that specifies at least one structured data schema of a computing device at the computing device; formatting information about at least one application programming interface of the computing device according to the at least one structured data schema, the formatted information specifying how the at least one application programming interface can be utilized; transmitting the formatted information from the computing device; receiving at least one application programming interface command at the computing device, the at least one application programming interface command generated at least based on processing the formatted information; and performing the at least one application programming interface command utilizing the computing device.

In one example, the method further comprises: receiving a connection request at the computing device, the connection request requesting available structured data schemas of the computing device; and transmitting the available structured data schemas from the computing device in response to the connection request.

In another example, the available structured data schemas include identification information regarding the computing device.

In a further example, the available structured data schemas include application programming interface information specifying application programming interfaces of the computing device.

In a further example, the at least one structured data scheme is a JSON schema.

In a variation, the method further comprises: transmitting results of the performance the at least one application programming interface command from the computing device.

In another variation, the results include state information of the computing device.

In another variation, the method further comprises: storing the at least one structured data schema in a machine readable storage media of the computing device.

In one example, the at least one structured data schema includes at least of a description of data, a minimum value of the data, or a maximum value of the data.

In another example, the method further comprises: adding at least one of a new one structured data schema or a new one application programming interface to the computing device.

According to a second aspect of the present invention, there is provided a method for communicating between computing devices, comprising: transmitting a communication request to a computing device, the communication request specifying at least one structured data schema of the computing device; receiving information about at least one application programming interface of the computing device from the computing device, the information formatted according to the at least one structured data schema, the information specifying how the at least one application programming interface can be utilized; generating at least one application programming interface command at least based on processing the received information; and transmitting the at least one application programming interface command to the computing device.

In one example, the method further comprises: transmitting a connection request requesting available structured data schemas of the computing device to the computing device; and receiving the available structured data schemas from the computing device.

In another example, the at least one application programming interface command comprises an ordered list of application programming interface commands.

In a further example, said generating at least one application programming interface command at least based on processing the received information comprises: receiving at least one user input; and generating the at least one application programming interface command at least based on processing the received information and the at least one user input.

In a variation, the method further comprises: receiving results of the performance the at least one application programming interface command by the computing device from the computing device.

In a variation, the method further comprises: testing the computing device by transmitting the at least one application programming interface command to the computing device and evaluating the results of the performance.

According to a third aspect of the present invention, there is provided a system for communicating between computing devices, comprising: at least one storage media operable to store at least one structured data schema and information about at least one application programming interface, the information specifying how the at least one application programming interface can be utilized; at least one communications component operable receive a communication request that specifies the at least one structure data schema; and at least one processing unit, communicably coupled to the at least one storage media and the at least one communications component, operable to format the information according to the at least one structured data schema and transmit the formatted information utilizing the at least one communications component; wherein the processing unit performs at least one application programming interface command received via the at least one communications component, the at least one application programming interface command generated at least based on processing of the formatted information.

In one arrangement, the system further comprises: a computing device, communicably coupled to the at least one communications component via at least one communication link; wherein the computing device transmits the communication request, receives the formatted information, and generates and transmits the at least one application programming interface command.

In one example, the at least one communications component receives a connection request from the computing device that requests available structured data schemas and the at least one processing unit transmits the available structured data schemas via the at least one communications component in response to the connection request.

In another example, the at least one storage media, the at least one communications component, and the at least one processing unit are components of at least one of a television receiver or a content streaming device.

In another aspect, the present invention is directed to a connection request is transmitted to a provider device and available structured data schemas are received from the provider device. A communication request is then transmitted to the provider device specifying one or more of the available structured data schemas. Information regarding APIs is received formatted according to the specified structured data schema. The formatted information specifies how the APIs of the provider device can be utilized. One or more API commands are generated by processing the formatted data and the API commands are transmitted to the provider device. Results of the performance may be received and evaluated.

Generally, the interface to the APIs provided through the structured data schemas is dynamic. Therefore the interface to the functions performable by the software that corresponds to the APIs is dynamic as well. Communication between the provider device and requestor devices is performed based on the specification of the APIs provided via the structure of the structured data schema. Configuration of the communication between the provider device and requestor devices based on separate documentation about functionality and corresponding APIs is unnecessary. If functions and/or the corresponding APIs are added or changed, structured data schemas may added to the provider device or modified on the provider device to reflect the additions or changes. Requestor devices that communicate with the provider device would efficiently access the changed or new structured data schema without any knowledge of any change or addition.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

Embodiments of the present invention will hereinafter be described by way example with reference to the accompanying drawings, in which:

BRIEF DESCRIPTION OF THE DRAWINGS

FIG. 4 is a flow chart illustrating an example state diagram of the method of FIG. 2 and the method of FIG. 3 by the system of FIG. 1.

DETAILED DESCRIPTION

Figure 1:
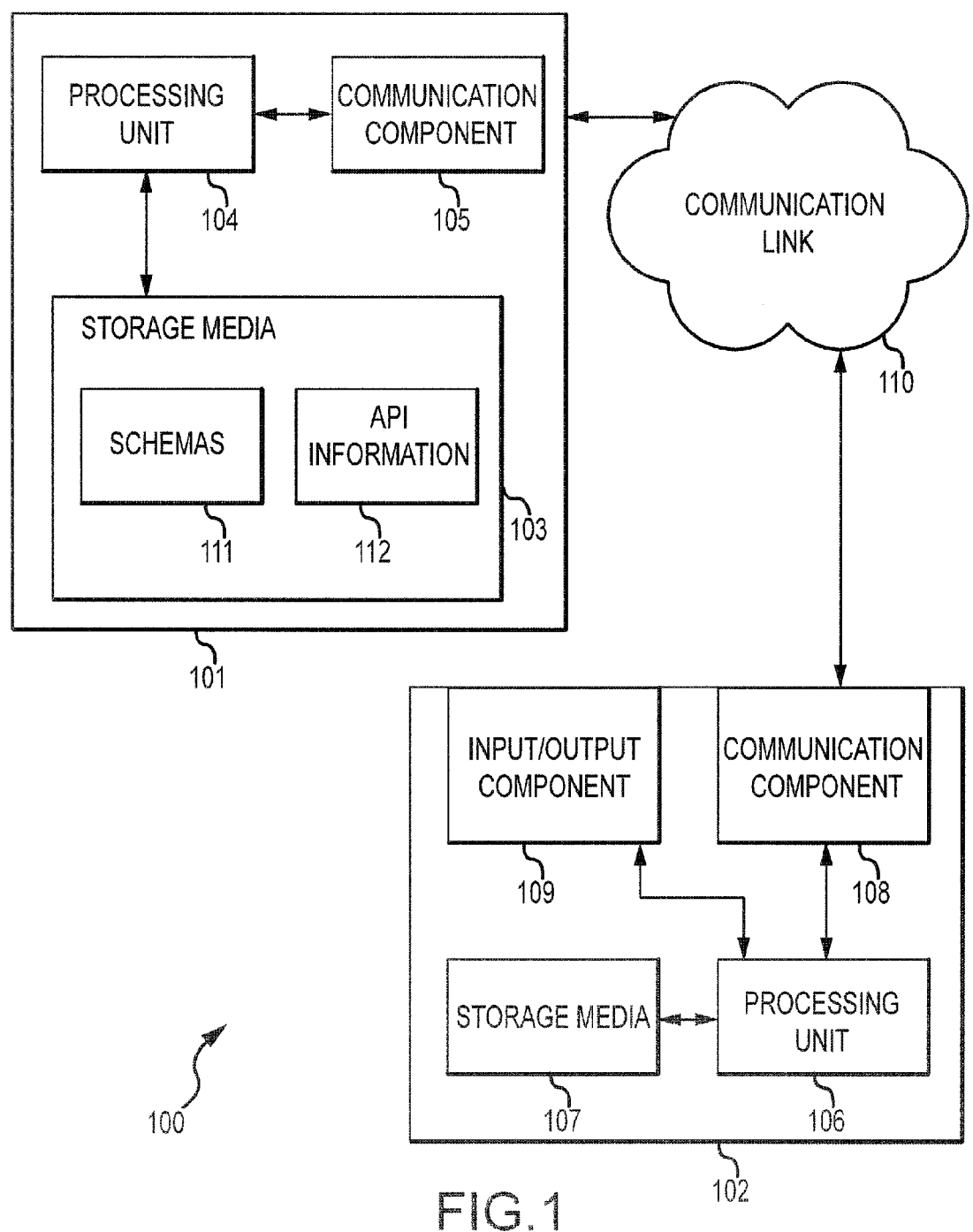
FIG. 1 is a block diagram illustrating a system for communicating with a computing device.

The description that follows includes sample systems and methods that embody various elements of the present disclosure. However, it should be understood that the described disclosure may be practiced in a variety of forms in addition to those described herein.

Computing devices are devices that manipulate data by executing instructions stored in a machine-readable media utilizing one or more processing units. Examples of such devices include desktop computers, television receivers, personal digital assistants, content streaming devices in satellite transmission systems, and so on. Computing devices are typically configured to execute software to perform various functions. Such devices often include application programming interfaces (APIs) to enable communication with software in order to utilize the various functions. Appropriate APIs may define how requestor computing devices can make calls to or request services from software executing on a provider computing device. The APIs may also determine the vocabulary and calling conventions the requestor devices employ to utilize the services. Such APIs may include specifications for routines, data structures, object classes, and/or protocols used to communicate between the requestor devices and the software executing on the provider device.

One of the many purposes for which requestor devices may communicate with a provider device is to perform testing on the provider device. "White box" testing is a term that refers to testing of a device based on knowledge of how a device functions. "Black box" testing is a term that refers to testing of a device based on knowledge of the inputs and outputs of the device, without knowledge of how the device actually operates. White box testing allows for more extensive testing than black box testing. For example, white box testing may include instruction a device to perform a supported function and observing the results. However, this is only possible with knowledge of how the device functions. Black box testing does not require knowledge of how the device operates but is generally limited to submitting inputs and monitoring external behavior.

In order requestor devices to perform white box testing on a provider device, the requestor devices generally need to be aware of the functions as well as the APIs that can be utilized to access those functions. Typically, the requestor devices are configured to test the provider device based on documentation of the functions and corresponding APIs. By contrast, black box testing typically offers limited ability to test those functions. Further, even if the requestor devices have specific knowledge of the functions and APIs of the computing device, such functions or APIs may change. Generally, if the functions and/or APIs for the provider device are updated, the requestor devices may need updating as well before being able to test the provider device.

The present disclosure provides systems and methods for communicating between computing devices. A provider device is configured to provide structured data schemas, such as JSON schemas, corresponding to one or more APIs of the provider device. When requestor devices connect to the provider device, the provider device is able to indicate which structured data schemas are available and, upon request, may provide information regarding utilization of the APIs. The information regarding utilization of the APIs is formatted according to one or more specified structured data schemas. This formatted data may allow the requestor devices to process the formatted data to generate API commands that are supported by the APIs of the provider device. The provider device may then perform the API commands generated and submitted by the requestor devices and may return results of such performance to the requestor devices for evaluation.

The disclosed systems and methods may facilitate remote testing the provider device. By providing information regarding the APIs that is formatted according to certain structured data schemas, gray box testing may be performed. "Gray box" testing is a term that refers to testing of a device based on more knowledge of the function of a device than is used in black box testing but less than that used for white box testing. Gray box testing generally provides more thorough testing than black box testing, but does not require exact knowledge of the function design of a device as would white box testing. Essentially, extensive testing of the provider device can be performed based on the provider device's structured data schema. This structured data schema may, for example, specify how to utilize graphic generation function API can be utilized and the graphic generation function may be tested according to the protocol specified by the structured data schema. Separate documentation about functionality and corresponding APIs may not be required, in effect the structured data schemas serve as their own documentation regarding utilization of the functionality and corresponding APIs.

Further, as the structured data schemas specify available functions and APIs for utilzing those functions, if functions of the provider device and/or the corresponding APIs are changed, only the related structured data schema may need updating. Requestor devices that connect to the provider device for testing purposes may access the updated structured data schema and thus may need no knowledge of any change. New APIs may be added along with new related structured data schemas. The requestor devices generally see the new structured data schema as available when connecting, but may not be informed that the related API is new or updated. Thus, the external interface to the provider device's APIs may be dynamic and/or self-updating.

FIG. 1 is a block diagram illustrating a system 100 for communicating between computing devices, in accordance with an embodiment of the present disclosure. The system 100 includes a provider device 101 communicably coupled to a requestor device 102 via a communication link 110. The provider device 101 includes at least one or more processing units 104, a storage medium 103 (which may be any machine-readable storage medium), and a communication component 105. The storage media 103 includes API information 112 relating both to one or more structured data schemas 111 and one or more APIs of the provider device 102. The structured data schemas 111 may be, for example, JSON schemas. The one or more processing units 104 may execute software instructions stored in the storage medium 103 to perform a variety of functions.

The requestor device 102 typically includes one or more processing units 106, a storage medium 107 (which may be any machine-readable storage medium), a communication component 108, and an input/output component 109. The requestor device 102 may utilize the one or more processing units 104 to execute software instructions stored in the storage medium 107.

The provider device 101 may be any kind of computing device such as a television receiver, a set-top box, and/or a component of a broadcast transmission system such as a content streaming device. The requestor device 102 may be any kind of computing device that communicates with the provider device 101, such as a desktop computer, a laptop computer, a server computer, and/or a cellular device. The requestor device 102 may communicate with the provider device 101 in order to test one or more functional aspects of the provider device 101 via the available structured data schemas 111 and the corresponding APIs.

The communication link 110 may include any kind of communication path between the provider device 101 and the requestor device 102. In one example, the communication link 110 may be a dedicated link between the provider device 101 and the requestor device 102, such as a serial communication cable. In another example, the communication link 110 may be a local area network and/or wide area network, such as a wired or wireless Ethernet network, a cellular network, and/or the Internet. In still other examples the communication link 110 may be a communication link other than a dedicated link or a network.

The requestor device 102 may request and retrieve identification of the provider device 101, including identification information and communication protocols, via the communication link 110. The requestor device 102 may then request and retrieve one or more available structured data schemas 111 from the provider device 101 via the communication link 110. The provider device 101 may be configured to allow the requestor device 102 access to or more of the structured data schemas 111, such as if the requestor device 102 is on an access control list of devices allowed access to the structured data schema 111 on an access control list.

The structured data schemas may include identifiers that identify the provider device 101 to enable the requestor device 102 to determine whether to communicate with the provider device 101. For example, the requestor device 102 may connect to a number of provider devices 101 connected via a network and may select the provider device 101 with which to communicate based on identifiers included in the structured data schemas.

To communicate with the provider device 101, the requestor device 102 typically specifies at least one of the available structured data schemas 111 and, in turn, receives data formatted according to the selected structured data schema 111. The formatted data specifies how the requestor device 102 can utilize one or more APIs of the provider device 101. That is, the formatted data, generated by the structured data schema 111, provides usage rights and abilities that permit the requestor device 102 to access function(s) of the API(s) resident on the provider computing device 101. The formatted data may include one or more default values for the APIs of the provider device 101, such as a description of data utilized by a function of an API, a minimum value of the data utilized by the function, a maximum value of the data utilized by the function, and so on. The requestor device 102 processes the formatted data, generates one or more commands, and instructs the provider device 101 to perform the commands through the API. The requestor device 102 may then receive and evaluate results from the provider device's 101 performance of the API commands.

The requestor device 102 may display output to a user via an output device connected to the input/output component 109, such as a monitor, and may receive input from the user via an input device connected to the input/output component 109, such as a keyboard or mouse. For example, the requestor device 102 may connect to the provider device 101 based on input from the user and may display the retrieved available structured data schemas 111 on the output device. The requestor device 102 may request one or more structured data schemas 111 based on input from the user and may display the formatted data. For example, the requestor device 102 may display information relating to how to utilize an API, formatted according to a structured data schema, as a web page in a browser. The requestor device 102 may also generate the commands based on both processing the formatted data that specifies how to utilize an API and input from the user that specifies what to utilize the API to accomplish. The requestor device 102 may then display the results of the performance of the commands and/or the evaluation of the results for the user.

Prior to connecting to the provider device 101, the requestor device 102 may have connection information for the provider device 101 available and may connect utilizing that information. Alternatively, the requestor device 102 may lack connection information for the provider device 101 and so may connect via a messaging service server (not shown), such as a Java Messaging Service ™ server. Such a messaging service server may provide the requestor device 102 a list of a computing devices to which the requestor device 102 may connect, including the provider device 101.

The provider device 101 may update one or more of its structured data schemas and/or one or more of its APIs. Such updating may occur by receiving and adding a new structured data schema and/or API. Alternatively, the provider device 101 may receive an alteration to a existing structured data schema and/or API and store the altered, updated data in the storage media 103. The provider device 101 may include a structured data schema and corresponding API that enables the provider device 101 to be updated remotely by the requestor device 102.

Figure 2:
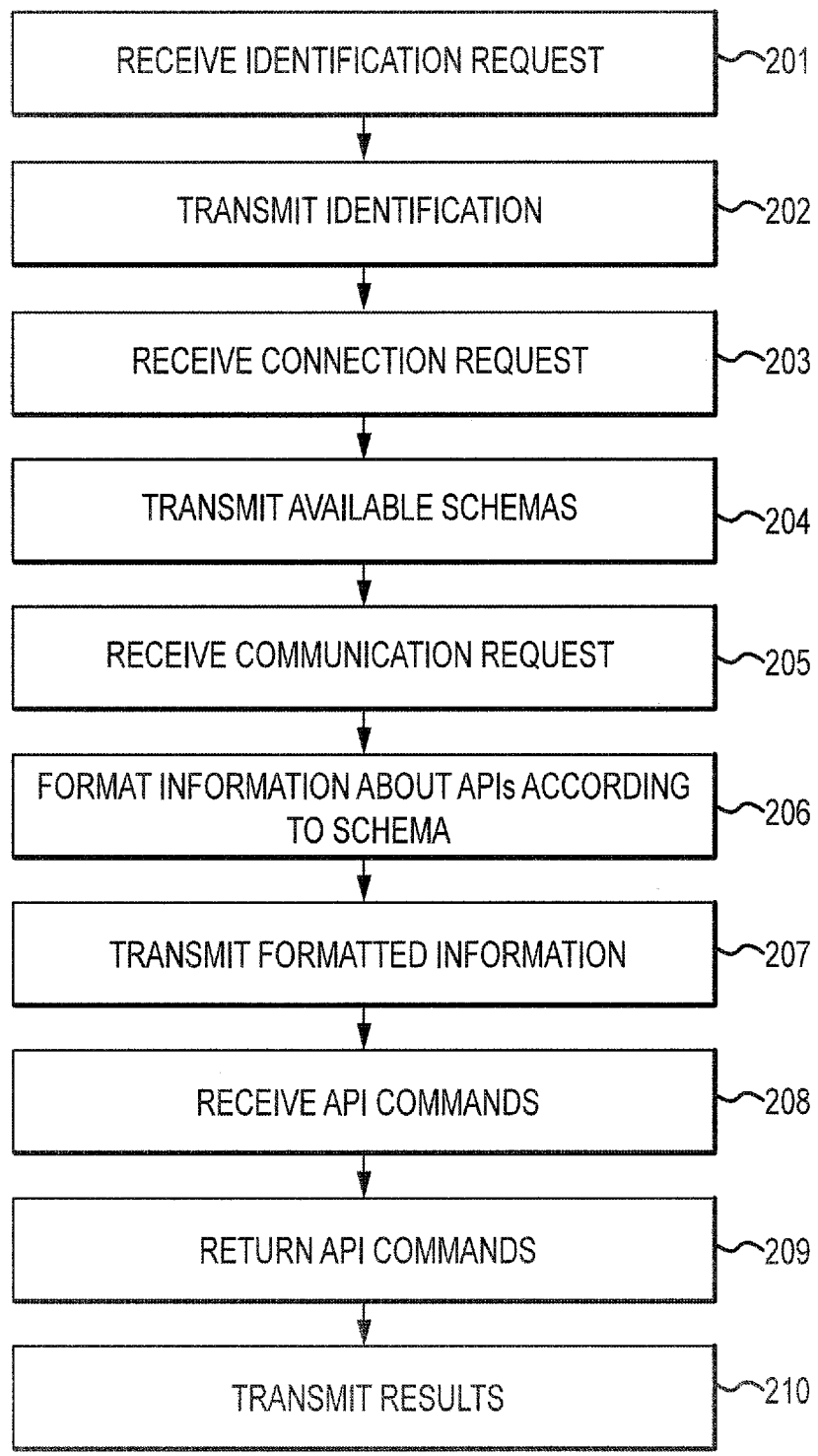
FIG. 2 is a flowchart illustrating a first method of communicating with a computing device which may be performed by the system of FIG. 1.

FIG. 2 illustrates a method 200 of communicating between computing devices which may be performed by the processing unit 104 of the provider device 101 loading and executing one or more instructions embodied in a computer-readable and/or machine-readable medium, such as the storage media 103 and/or another storage medium.

In operation 201 the provider device 101 receives an identification request. The identification request may ask for identification information and communication protocols of the provider device 101. In operation 202, the provider device 101 transmits the identification information to the requestor (such as the requestor device 102).

In operation 203, the provider device 101 receives a connection request. The connection request may ask for available structured data schemas 111 resident on the provider device 101. In operation 204, the provider device 101 transmits the available structured data schemas 111 to the requestor. Identification information for the provider device 101 may be sent with, or as part of, these schemas.

In operation 205, the provider device 101 receives a communication request. The communication request typically requests access to at least one of the available structured data schemas 111 of the provider device 101.

In operation 206, the provider device 101 formats information 112 regarding its APIs according to protocols set forth in the specified available structured data schema 111. In operation 207, the provider device 101 transmits the formatted information to the requestor.

In operation 208, the provider device 101 receives one or more API commands. The API commands are generated at least based on processing of the formatted information. In operation 209, the provider device 101 performs the API commands. An example of performing such commands is set out below in paragraph 0055.

Optionally, the method 200 may include operation 210. In operation 210, the provider device 101 transmits the results of performing the API commands. The results may include state information regarding the provider device 101 while it performed the API commands.

Figure 3:
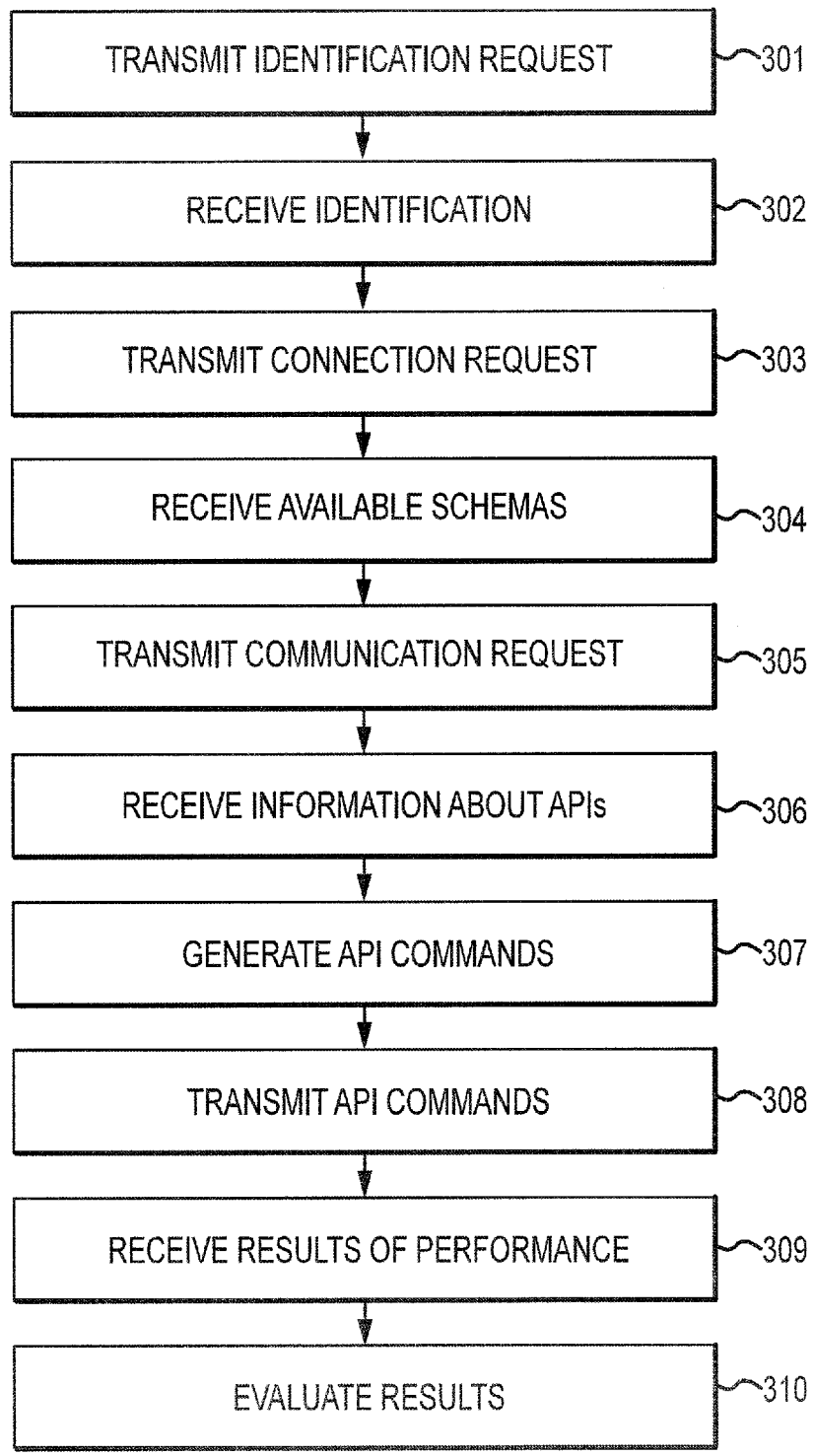
FIG. 3 is a flowchart illustrating a second method of communicating with a computing device which may be performed by the system of FIG. 1.

FIG. 3 illustrates a method 300 of communicating between computing devices; this method may be performed by the requestor device 102, for example. In one embodiment, the requestor device 102 may perform the method 300 loading and executing one or more instructions embodied in a computer-readable and/or machine-readable medium, such as the storage medium 107 and/or another storage medium. For example, the provider device 102 may perform the method 300 through a web browser application.

In operation 301, the requestor device 102 transmits a identification request to a provider, such as the provider device 101. The identification request may ask for identification information and communication protocols of the provider. In operation 302, the requestor device 102 receives the identification.

In operation 303, the requestor device 102 transmits a connection request to the provider. The connection request may ask for available structured data schemas 111 resident on the provider. In operation 304, the requestor device 102 receives the available structured data schemas 111 from the provider. These schemas 111 may include, for example, identification information regarding the provider as well as information regarding the provider's functions and/or APIs.

In operation 305, the requestor device 102 transmits a communication request to the provider. This communication request typically requests access to at least one of the available structured data schemas 111 of the provider in order for the requestor device 102 to be able to access one or more functions through one or more related APIs.

In operation 306, the requestor device 102 receives information regarding the provider's APIs from the provider. The information is formatted according to the specified structured data schemas 111.

In operation 307, the requestor device 102 generates one or more API commands based on processing the received information regarding the APIs. The one or more API commands may involve a script, or a list of API commands configured in a particular order.

The requestor device 102 may generate the aforementioned API commands by processing the information received in operation 340 along with any input received from a user via the input/output component 109.

The requestor device 102 may display the received information from the provider in a browser application. A user may enter input, based on the information displayed in the browser application via an input device connected to the input/output component 109. The processing unit 106 of the requestor device 102 may then generate the API commands from the received information, in light of the input received from the user. For example, the requestor device 102 may display a web page, based on received information, concerning an API that corresponds to rebooting the provider. The web page may include a text box for a user to enter a number of times to reboot the provider. If the user enters the number twenty in the text box, the requestor 102 may generate a command to reboot the provider twenty times.

In operation 308, the requestor device 102 transmits the one or more API commands to the provider.

Optionally, the method 300 may include operation 309 and operation 310. In operation 309, the requestor device 102 receives results from the provider regarding its performance of the API commands. In operation 310, the requestor device 102 may evaluate the results.

FIG. 4 illustrates a sample flow 400 of a provider (such as the provider device 101) performing the method 200 and a requestor (such as the requestor 102) performing the method 300. The flow starts at block 401 and proceeds to block 402. At block 402, the requestor transmits a identification request to the provider and the flow proceeds to block 403. At 403, the provider receives the identification request and the flow proceeds to block 404. At block 404, the provider transmits the identification to the provider and the flow proceeds to block 405. At 405, the requestor receives the identification and the flow proceeds to block 406.

At block 406, the requestor transmits a connection request to the provider and the flow proceeds to block 407. At 407, the provider receives the connection request and the flow proceeds to block 408. At block 408, the provider transmits available schemas resident on the provider and the flow proceeds to block 409. At block 409, the requestor receives the available schemas from the provider and the flow proceeds to block 410.

At block 410, the requestor transmits a communication request to the provider and the flow proceeds to block 411. At block 411, the provider receives the communication request and the flow proceeds to block 412.

At block 412, the provider formats information regarding its APIs according to protocols of at least one structured data schema specified in the communication request and the flow proceeds to block 413. At block 413, the provider transmits the formatted information and the flow proceeds to block 414.

At block 414, requestor receives the formatted information about the APIs from the provider and the flow proceeds to block 415. At block 415, the requestor generates one or more API commands at least by processing the formatted information and the flow proceeds to block 416. At block 416, the requestor transmits the API commands to the provider and the flow proceeds to block 417.

At block 417, the provider receives the API commands and the flow proceeds to block 418. At block 418, the provider performs the API commands and the flow proceeds to block 419. At block 419, the provider transmits the results of performing the API commands and the flow proceeds to block 420.

At block 420, the requestor receives the results from the provider regarding its performance of the API commands and the flow proceeds to block 421. At block 421, the requestor evaluates the results. The flow then proceeds to block 422 and ends.

In one example implementation, the provider device 101 includes a calculator function that may be accessed remotely through a calculator API. Also in this implementation, the provider device 101 includes a calculator JSON schema which corresponds to the calculator API. A user may utilize a browser application, implemented by the requestor device 102, to send a identification request to the provider device 101. Although this example implementation describes a user interacting with a web browser, a user may interact with any kind of user interface to direct communication between the requestor device 102 and the provider device 101. When the requestor device 101 transmits the identification request to the provider device 101, the provider device 101 responds to the requestor device 102 and provides an identifier and communication protocol preferences for the provider device 101. The browser application then displays the provider device's 101 identifier and/or communication protocol preferences. The user may then utilize the browser application to send a connection request to the provider device 101. When the requestor device 101 transmits the connection request to the provider device 101, the provider device 101 responds to the requestor device 102 by formatting information about the calculator schema and transmitting that formatted information to the requestor device 102.

The browser application then displays the formatted information to the user. The formatted information specifies how the calculator API can be accessed and utilized. For example, the formatted information may specify that the calculator API facilitates a division operation that can be utilized by transmitting a Divide (first operand, second operand) command to a particular port of the provider device 101. Through the browser application, the user may direct the calculator function by selecting possibilities and entering data. The requestor device 102 generates a series of API commands based on the user's actions and the information specifying how to utilizing the calculator API.

Thus, in this example the connection request and communication request are the same request. However, in other examples the APIs may be more dynamic and the connection request and communication request may be separate requests. For instance, a file download API may support downloading a file from a device. In such a case, in response to the connection request the browser application may display a drop down list a list of possible drives. The communication request then specifies the drive that is selected by the user. In response to the communication request the browser application may display the drive as fixed and a new drop down list with all the files on that drive where the user can select a file. The API command then specifies the drive and file selected by the user to initiate the download upon.

Returning to the implementation discussed above, in one example, the calculator API facilitates at least an addition operation and a subtraction operation. The formatted information specifies that the addition operation and the subtraction operation are available operations for the calculator API. The formatted information also specifies that that the addition operation can be utilized by transmitting an Addition(first operand, second operand) command to a particular port of the provider device 101 and the subtraction operation can be utilized by transmitting a Subtraction(first operand, second operand) command to the particular port of the provider device 101.

When this formatted information about the addition operation and the subtraction operation are displayed in the browser, the user may decide to test these operations of the calculator API of the provider device 101. The browser application may allow the user to repeatedly drag and drop the displayed addition operation and/or subtraction operation to form a list of API commands to generate in a particular order. Although this example describes the user's input in terms of dragging and dropping, a user may enter input in any manner without departing from the scope of the present disclosure. After dragging and dropping the user selected addition operation and/or subtraction operation, the browser application may allow the user to modify information about the operation, such as the operands.

In this example, the user forms the list of API commands to generate by dragging and dropping the addition operation ten times and then the subtraction operation ten times. The user may modify the information about each of the dragged and dropped operations by inputting values for the operands. For example, the user may specify that the first operand of the ten addition operations is five and that the second operand of the ten addition operations is four. The user may also specify that the first operand of the ten subtraction operations is six and that the second operand of the ten subtraction operations is two. The requestor device 102 may then generate an ordered list of API commands based on the user's input. Here, this list instructs the provider device 101 to add five plus four ten times utilizing the calculator API and then subtract two from six ten times utilizing the calculator API. Once constructed, the requestor device 102 may transmit the ordered list of API commands to the provider device 101.

The provider device 101 receives and performs the ordered list of API commands. The provider device 101 then transmits the results of the ten addition operations and the ten subtraction operations to the requestor device 102. Upon receipt of the results, the requestor device 101 verifies that the results of the ten addition operations are all nine and that the results of the ten subtraction operations are all four. If the results of all the specified operations are correct, the browser application may display a message to the user that the test completed successfully. If one or more results of the specified operations are not correct, the browser application may display an error message to the user. The error message may indicate which operation did not complete successfully and may indicate the incorrect result.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may take the form of, but is not limited to, a: magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for communicating between computing devices, comprising:
   receiving a connection request from a requestor device at a computing device, the connection request requesting available structured JavaScript Object Notation (JSON) schemas of the computing device; and
   transmitting the available structured JSON schemas from the computing device in response to the connection request;
   receiving a communication request from the requestor device at the computing device, wherein the communication request specifies at least one structured JSON schema of the computing device, wherein the at least one structured JSON schema comprises one of the available structured JSON schemas, wherein the computing device comprises a set-top box compatible for use with a television set, wherein the communication request comprises a Java Messaging Service request for a communication connection via a Java Messaging Service server and a selection of one of a plurality of connection options presented by the Java Messaging Service server, and wherein the plurality of connection options comprises a list of computing devices configured for connection via the Java Messaging Service server;
   formatting information about at least one application programming interface (API) of the computing device according to the at least one structured JSON schema, the formatted information specifying how the at least one API can be utilized;
   transmitting the formatted information from the computing device, wherein the formatted information provides usage rights and abilities that permit the requestor device to access functions of the at least one API resident on the computing device and includes one or more default values for the at least one API of the computing device;
   receiving at least one API command at the computing device, the at least one API command generated at least based on processing the formatted information; and
   performing the at least one API command utilizing the computing device.

2. A method as claimed in claim 1, wherein the available structured JSON schemas include identification information regarding the computing device.

3. A method as claimed in claim 1, wherein the available structured JSON schemas include API information specifying APIs of the computing device.

4. A method as claimed in claim 1, further comprising:
   transmitting results of the performance of the at least one API command from the computing device.

5. A method as claimed in claim 4, wherein the results include state information of the computing device.

6. A method as claimed in claim 1, further comprising:
   adding at least one of a new one structured JSON schema or a new one application programming interface to the computing device.

7. A method for communicating between computing devices, comprising:
   transmitting a connection request to a computing device from a requestor device, requesting available structured JavaScript Object Notation (JSON) schemas of the computing device;

receiving the available structured JSON schemas from the computing device, in response to the transmitted connection request;

transmitting a communication request to the computing device from the requestor device, the communication request specifying at least one structured JSON schema of the computing device, wherein the at least one structured JSON schema of the computing device comprises one of the available structured JSON schemas received from the computing device, in response to the transmitted connection request, wherein the computing device comprises a set-top box compatible for use with a television set, wherein the communication request comprises a Java Messaging Service request for a communication connection via a Java Messaging Service server and a selection of one of a plurality of connection options presented by the Java Messaging Service server, and wherein the plurality of connection options comprises a list of computing devices configured for connection via the Java Messaging Service server;

receiving formatted information about at least one application programming interface (API) of the computing device from the computing device at the requestor device, the information formatted according to the at least one structured JSON schema, the information specifying how the at least one API can be utilized, wherein the structured JSON schema provides usage rights and abilities that permit the requestor device to access functions of the computing device and includes one or more default values for at least one API of the computing device;

generating at least one API command at least based on processing the received information at the requestor device; and transmitting the at least one API command from the requestor device to the computing device.

8. A method as claimed in claim 7, wherein said generating at least one API command at least based on processing the received information comprises:
   receiving at least one user input; and
   generating the at least one API command at least based on processing the received information and the at least one user input.

9. A method as claimed in claim 7, further comprising:
   receiving results of the performance of the at least one API command by the computing device from the computing device.

10. A system for communicating with a requestor device, the system comprising:
    a set-top box compatible for use with a television set, the set-top box comprising:
    at least one storage media operable to store at least one structured JavaScript Object Notation (JSON) schema and information about at least one application programming interface, the information specifying how the at least one application programming interface (API) can be utilized;
    at least one communications component operable to receive:
       a connection request from the requestor device that requests available structured JSON schemas; and
       a communication request from the requestor device that specifies the at least one structured JSON schema, wherein the communication request comprises a Java Messaging Service request for a communication connection via a Java Messaging Service server and a selection of one of a plurality of connection options presented by the Java Messaging Service server, and wherein the plurality of connection options comprises a list of computing devices configured for connection via the Java Messaging Service server;
    at least one processing unit, communicably coupled to the at least one storage media and the at least one communications component, operable to:
       transmit the available structured JSON schemas via the at least one communications component in response to the connection request; and
       format the information according to the at least one structured JSON schema and transmit the formatted information utilizing the at least one communications component, wherein the formatted information provides usage rights and abilities that permit the requestor device to access functions of an application program interface (API) resident on the system and that includes one or more default values for the API of the system;
    wherein the processing unit performs at least one API command subsequently received from the requesting device via the at least one communications component, the at least one API command generated at least based on processing of the formatted information.

11. A system as claimed in claim 10, further comprising:
    a computing device, communicably coupled to the at least one communications component via at least one communication link, wherein the requestor device comprises the computing device;
    wherein the computing device is operable to transmit the communication request, receive the formatted information, and generate and transmit the at least one application programming interface command.

* * * * *